No. 773,362. PATENTED OCT. 25, 1904.
A. ANDERSON.
DRIVE GEARING.
APPLICATION FILED MAR. 14, 1904.
NO MODEL.

Witnesses

Inventor
Alfred Anderson.
by
R. M. Lacey, Attorneys

No. 773,362. Patented October 25, 1904.

UNITED STATES PATENT OFFICE.

ALFRED ANDERSON, OF DETROIT CITY, MINNESOTA, ASSIGNOR OF THREE-FOURTHS TO ASAHEL G. WEDGE, HALVOR RASMUSSON, AND PETER K. HASLERUD, OF DETROIT CITY, MINNESOTA.

DRIVE-GEARING.

SPECIFICATION forming part of Letters Patent No. 773,362, dated October 25, 1904.

Application filed March 14, 1904. Serial No. 198,138. (No model.)

*To all whom it may concern:*

Be it known that I, ALFRED ANDERSON, a citizen of the United States, residing at Detroit City, in the county of Becker and State of Minnesota, have invented certain new and useful Improvements in Drive-Gearings, of which the following is a specification.

This invention has for its object to materially reduce friction, lessen the wear, and save power in heavy-running machinery embodying cog-gearing as the power-transmitting means.

The invention is primarily designed to provide gearing for agricultural machinery—such as harvesters, binders, threshers, mowers, separators, and the like—whereby a material saving is produced. Obviously the gearing may be used in other connections where power is transmitted through cog-wheels.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
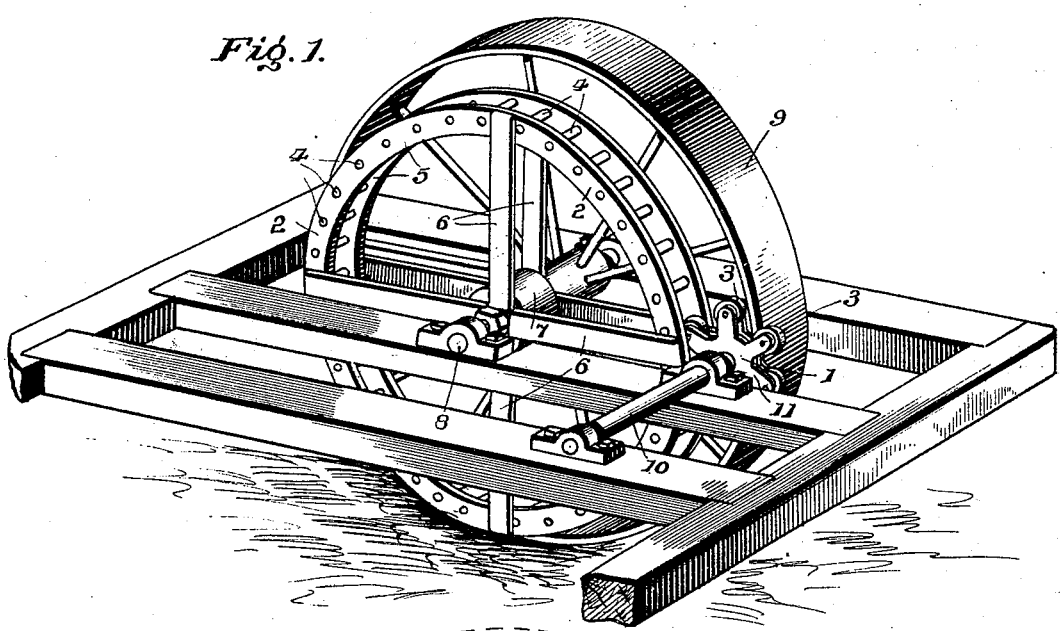
Figure 2:
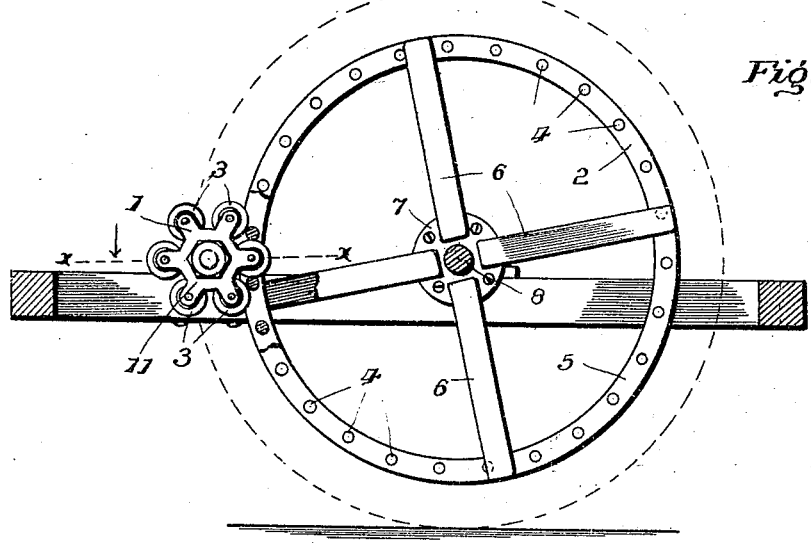
Figure 3:
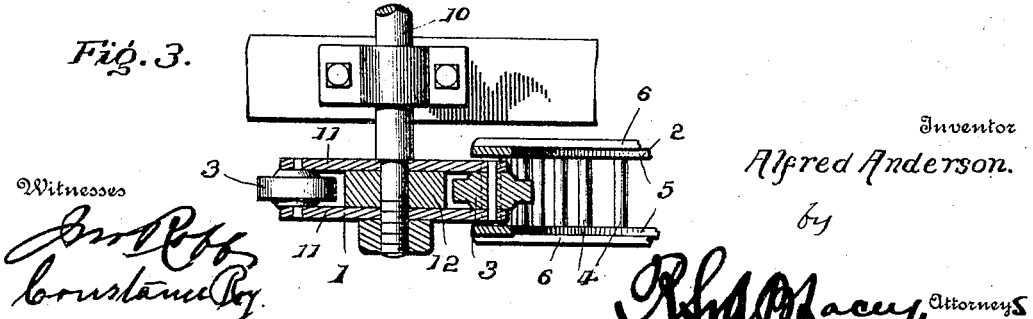

Figure 1 is a detail perspective view of a portion of the framework of a harvester or like agricultural machine, illustrating the application of the invention. Fig. 2 is a detail view of the gear-wheel provided with roller-cogs and a portion of the intermeshing gear-wheel comprising spaced members and connecting-pins, the latter constituting cogs for coöperation with the roller-cogs of the intermeshing gear-wheel. Fig. 3 is a section of the parts shown in Fig. 2 on the line X X.

Corresponding and like parts are referred to in the following description and indicated in all the views of the drawings by the same reference characters.

As shown in the drawings, the gearing comprises the gear-wheels 1 and 2, the gear-wheel 1 being provided with roller-cogs 3 and the gear-wheel 2 with pins 4, forming cog elements for intermeshing with the roller-cogs 3 in the operation of the gear-wheels. In order to distinguish the gear-wheels, they will be designated by the terms "roller cog-wheel" and "pin cog-wheel," the first being designated by the reference-numeral 1 and the latter by the numeral 2.

The pin cog-wheel 2 comprises spaced rings or members 5, and the pins 4 connect them at regular intervals and are spaced apart a distance corresponding approximately to the diameter of the roller-cogs 3. Arms 6 connect the rings 5 with the hub 7, which latter is secured to the axle or shaft 8, which in the present instance is the recipient of the power and has the ground or drive wheel 9 mounted thereon. The pin cog-wheel 2 is many times the diameter of the roller cog-wheel, whereby the latter is speeded in the operation of the gearing. The pins 4 connect the rings or members 5 and are secured thereto in any substantial manner, so as to provide, in effect, a rigid structure.

The roller cog-wheel 1 is secured to a shaft 10 and is preferably composed of spaced plates 11, block 12, arranged between the plates and mounted upon the shaft 10, and the roller-cogs 3, mounted in points or projections of the plates 11, whereby ample clearance is had for the entrance of the pin-cogs 4 between the roller-cogs 3 in the operation of the gearing.

In the operation of the gearing the pin-cogs 4 intermesh in successive order with the roller-cogs 3, and as the pins come into engagement with the roller-cogs the latter are rotated upon their axes in one direction, and as the pin-cogs leave said roller-cogs the latter are rotated upon their axes in a reverse direction, with the result that the friction between the cog elements of the roller and pin cog-wheels is reduced to the smallest amount possible and the gearing made extremely light running, which is of special advantage in heavy and cumbersome machinery, such as generally employed in the field or agricultural pursuits.

Having thus described the invention, what is claimed as new is—

In drive-gearing, the combination of a pin cog-wheel and a companion cog-wheel composed of spaced plates having corresponding projections, a block arranged between said plates for properly spacing them, and roller-cogs journaled between the projecting portions of said plates and adapted to intermesh with the pins of the first-mentioned cog-wheel, substantially as specified.

In testimony whereof I affix my signature in presence of two witnesses.

ALFRED ANDERSON. [L. S.]

Witnesses:
　FRANK RICHARDSON,
　CHAS. G. STURTEVANT.